(12) United States Patent
Famolari

(10) Patent No.: US 8,718,089 B2
(45) Date of Patent: May 6, 2014

(54) AGGREGATION AND FRAGMENTATION OF MULTIPLEXED DOWNLINK PACKETS

(75) Inventor: David Famolari, Stewartsville, NJ (US)

(73) Assignees: Toshiba America Research Inc., Piscataway, NJ (US); Telcordia Technologies Inc., Piscataway, NJ (US)

( * ) Notice: Subject to any disclaimer, the term of this patent is extended or adjusted under 35 U.S.C. 154(b) by 861 days.

(21) Appl. No.: 10/932,322

(22) Filed: Sep. 2, 2004

(65) Prior Publication Data

US 2005/0053066 A1    Mar. 10, 2005

Related U.S. Application Data

(60) Provisional application No. 60/500,644, filed on Sep. 8, 2003.

(51) Int. Cl.
*H04J 3/16* (2006.01)

(52) U.S. Cl.
USPC .......... 370/466; 370/468; 370/469; 370/471; 370/473; 370/474; 370/475; 370/476

(58) Field of Classification Search
USPC ............. 370/389, 390, 391, 392, 393, 394, 370/395.1, 400, 401, 469, 474
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,363,058 | B1 * | 3/2002 | Roobol et al. | 370/310 |
| 6,519,223 | B1 * | 2/2003 | Wager et al. | 370/216 |
| 6,963,751 | B1 * | 11/2005 | Kordsmeyer et al. | 455/466 |
| 7,020,822 | B2 * | 3/2006 | Ho et al. | 714/748 |
| 2002/0042270 | A1 * | 4/2002 | Yi | 455/424 |
| 2003/0133427 | A1 * | 7/2003 | Cimini et al. | 370/338 |
| 2003/0179751 | A1 * | 9/2003 | Omae et al. | 370/392 |
| 2003/0188010 | A1 * | 10/2003 | Raza et al. | 709/238 |
| 2004/0233878 | A1 * | 11/2004 | Liu et al. | 370/338 |

* cited by examiner

*Primary Examiner* — Alvin Zhu
(74) *Attorney, Agent, or Firm* — Banner & Witcoff Ltd.

(57) ABSTRACT

A system and method for aggregating and fragmenting packets is described. Data packets containing voice data and other data that suffer significantly in quality when delayed may be aggregated together and fragmented. The aggregation and fragmentation permits networks to push these time-sensitive packets more easily through a network based on priority given to fragmented data.

23 Claims, 7 Drawing Sheets

AGGREGATION AND FRAGMENTATION OF MULTIPLEXED DOWNLINK PACKETS

RELATED APPLICATION INFORMATION

This application claims priority to U.S. Ser. No. 60/500,644, filed Sep. 8, 2003, whose contents are expressly incorporated herein by reference.

BACKGROUND OF THE INVENTION

1. Field of the Invention

Aspects of the present invention relate to communication systems. More particularly, aspects of the present invention relate to controlling throughput on wireless communication systems.

2. Description of Related Art

Wireless transmission systems are used for both data and voice transmissions. While data transmissions are generally immune to minor delays because of network traffic, voice transmissions are not so immune. Quality of service guarantees (QoS) are often provided to voice users to minimize delays. These guarantees often lead to unnecessary regulation of an access point and minimize the number of users who can use the access point at any given time.

A variety of different standards exist for wireless transmission protocols. The IEEE 802.11 standard is the most commonly deployed Wireless Local Area Network (WLAN) standard. While 802.11 offers high-speed wireless data access, it is not well suited for isochronous services that require bounded delays such as voice, video, and other interactive applications. In particular, 802.11-configured WLANs exhibit poor voice capacity. This problem stems from limitations in the mandatory medium access control (MAC) protocol used in 802.11 called the Distributed Coordination Function (DCF). The DCF is based on a contention process that mandates that a station must separate consecutive packet transmissions with a deferral period of random duration. This deferral period, while designed to minimize packet collisions and provide fair access to the medium, severely limits the timely delivery of isochronous services. Furthermore, 802.11 networks commonly include an Access Point (AP) that serves as the single point of entry into and out of the WLAN. Despite this increased burden, the AP is afforded no special privileges. This disparity often creates a bottleneck situation at the AP and is a major contributing factor to poor WLAN voice capacity.

An improvement is needed for handling voice transmissions in wireless networks.

BRIEF SUMMARY

Aspects of the invention address one or more of the issues described above, thereby providing better voice handling capabilities in wireless communication systems.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
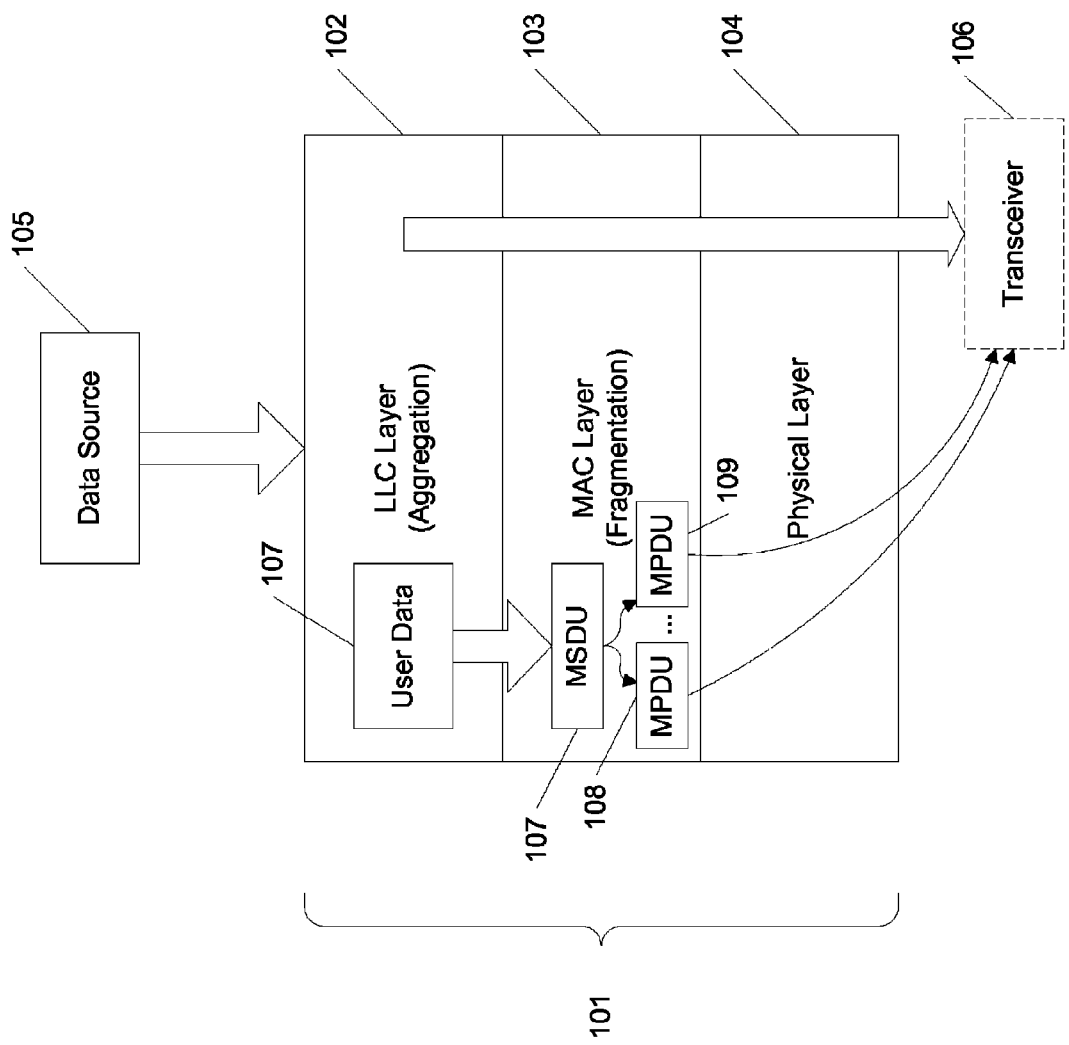
FIG. 1 shows a block diagram in accordance with aspects of the present invention.

Aspects of the invention relate to providing improved throughput for wireless communications. While described with reference to IEEE 802.11 standards, aspects of the invention may be used with other protocols as well.

Aspects of the invention of describe methods by which an AP may send consecutive packets without waiting for a random deferral period. Moreover, these methods enable consecutive packets addressed to different destinations to be transmitted by the AP while minimizing possible inter-transmission time. This may improve downlink voice performance and increase WLAN voice capacity. Furthermore, aspects of the invention allow the AP to dynamically vary the parameters of the approach is described herein—e.g., the number of consecutive packets, the destination addresses, the frequency of employment, etc.—to meet current operating objectives and performance targets. This adaptive ability makes the approach flexible and applicable to a wide number of situations.

Aspects of the invention may improve performance for isochronous applications, and they be used to improve performance for delay-tolerant applications as well. Additionally, aspects of the invention can be used as a means to enforce policy decisions regarding downlink medium access. Ensuring that all downlink flows are granted an equal share of the medium is one example of the kind of policies that can be enforced. Granting special, or "priority", or increased share of the medium is just one of the other policies that may be enforced as well.

The following is divided into sections as follows: terms, wireless communications, IEEE 802.11, DCF, fragmentation and fragment transmission, signal flow in 802.11, and processes for aggregation and fragmentation.

It is noted that various connections are set forth between elements in the following description. It is noted that these connections in general and, unless specified otherwise, may be direct or indirect and that this specification is not intended to be limiting in this respect.

Terms

AP—Access Point
PHY—Physical Layer
LLC—Logical Link Control
MAC—Medium Access Control
DCF—Distributed Coordination Function
CSMA/CA—Carrier Sensing Multiple Access with Collision Avoidance
DIFS—Distributed Inter-Frame Space
SIFS—Short Inter-Frame Space
EIFS—Extended Inter-Frame Space
CW—Contention Window
MSDU—MAC Service Data Unit.
MPDU—MAC Protocol Data Unit. Also referred to as a fragment.
FSDU—A fragmented MAC Service Data Unit.

Wireless Communications

WLANs, like most communications systems, employ a layered approach where certain network functions are contained in certain layers. Each layer is responsible for faithfully executing its responsibilities and communicating with other layers through standard defined interfaces. The layering approach hides the implementation of the functionality from other layers. This effectively separates functionality from implementation, allowing manufacturers to develop innovative implementations that achieve standards-required functionality and that easily integrated with other layers. By using standard interfaces, designers can build layer functionality that is independent of functionality at other layers, improving interoperability and development.

FIG. 1 shows an example of three layers in an access point AP 101. Logical Link Control (LLC) layer 102 delivers data information from data source 105 to Medium Access Control (MAC) layer 103. MAC layer 103 modifies and forwards the data information to physical (PHY) layer 104, where physical layer 104 then forwards the data information to a transceiver 106. To more readily appreciate the invention, aspects of the IEEE 802.11 standard are described in detail.

IEEE 802.11

The IEEE 802.11 standard defines and specifies the behaviors of two layers: the Physical (PHY) layer 104 and the MAC layer 103. The former deals with all the baseband and radio operations that enable 802.11 stations to produce, detect, and interpret radiated energy; allowing a 'channel' to be formed by which data signals can be exchanged. The latter deals with regulating each terminal's access to this channel. The third layer, the Logical Link Control (LLC) layer 102, is also discussed in the 802.11 standard. This layer delivers data information to the MAC layer 103 for transmission and receives data from the MAC layer 103 indicating the fate (success/failure) of such transmissions. These three layers are organized on top of each other with the LLC 102 resting on top of the MAC 103, resting on top of the PHY 104.

The IEEE 802.11 standard, when implemented in communications systems, moves information between LLC 102 layers on different machines. To accomplish this goal, the 802.11 standard does not define the behavior of the LLC layer itself, as it does for the MAC and PHY layers, but rather defines a set of interfaces between the LLC and MAC layers. These interfaces ensure that information is exchanged between these two layers in a consistent and standard fashion.

In IEEE 802.11, the transmission process and terminology are as follows. The LLC sends user data 107 to the MAC layer, which collects this raw information into a MAC Service Data Unit (MSDU) 107. The MAC layer then processes the MSDU according to the standard 802.11 DCF rules and repackages it into one or more MAC Protocol Data Units (MPDUs) 108-109. This information is then sent to the PHY layer. The PHY layer in turn processes the information in accordance with the standard 802.11 PHY rules and sends the data over the channel where a receiving station will collect it. The receiving station then performs essentially the reverse procedure—sending the data from its PHY to its MAC and then, finally, on to its LLC.

DCF

Stations operating in an 802.11 WLAN share a common medium. Medium Access Control (MAC) is governed by a "listen-before-talk" principle that helps reduce the probability of collisions and wasted transmissions. This principle is enforced through a Carrier Sensing Multiple Access with Collision Avoidance (CSMA/CA) MAC protocol. This CSMA/CA MAC protocol calls for stations to perform carrier sensing to determine if the medium is busy or idle. Stations are not allowed to transmit when their carrier sensing mechanism detects a busy medium.

A station that wishes to transmit a packet must first ensure that its carrier sensing mechanism reports an idle medium for a period of time referred to as a Distributed Inter-Frame Space (DIFS). If during this DIFS period the carrier sensing mechanism reports a busy medium, the station will enter a random backoff mode. At this point, the station will randomly select a backoff timer from a uniform distribution within a group of integers. The group of integers may be referred to as the Contention Window (CW). The contention window may begin at 0 and end at a specified maximum value called CWmax. The backoff timer represents an integer number of timeslots, each 10-microseconds long. In addition to the DIFS interval, the station must further observe an idle medium for the duration of the backoff timer before it can begin transmission. After observing an idle medium for a DIFS duration, the station will begin to decrement the backoff timer; the backoff timer decrements once for each timeslot where its carrier sensing mechanism reports an idle medium. If at any time during this period the station's carrier sensing mechanism reports a busy medium, the countdown will be suspended until an idle medium is detected for a DIFS duration, at which point the countdown will resume. Once the backoff timer has reached a value of 0, the station may commence transmission.

Upon correctly receiving and decoding the transmitting packet, the receiving station will generate an acknowledgement packet. The receiving station will transmit this acknowledgement according to the DCF operating rules described above, but with one exception: stations transmitting acknowledgements are not required to wait for a DIFS period; instead they are only required to wait a small fraction of that time—called a Short Inter-Frame Space (SIFS)—before transmitting. By using carrier sensing and a SIFS value that is significantly smaller than a DIFS, the 802.11 standard ensures that acknowledgements face no medium access contention and can be quickly transmitted.

If a transmitting station does not receive a positive acknowledgement of its transmission, it will re-enter the backoff mode. However, in this case, the Contention Window will double and all waiting periods requiring a DIFS value in the original backoff mode will now require an Extended Inter-Frame Space (EIFS) value which may be roughly 7 times as long as a DIFS.

If the transmitting station does receive a positive acknowledgement, it will again enter a backoff stage—called post-transmission backoff. The transmitting station enters into post-transmission backoff regardless of whether or not it has another packet to transmit. By making all stations enter a post-transmission backoff stage, the standard ensures that a station always separates consecutive packet transmissions by at least one backoff stage.

Fragmentation and Fragment Transmission

The IEEE 802.11 standard defines a fragmentation method by which large MSDUs 107 are broken up into multiple MPDUs 108-109 (called fragments in this case), transmitted and reconstituted at the receiver. MPDUs that are part of a fragmenting process are treated differently than stand-alone MPDUs by the 802.11 standard. While, as discussed above, the DCF mode mandates a post-transmission backoff stage for stand-alone MPDUs, this is not the case for fragment MPDUs. Fragments of a larger packet can be transmitted immediately following a SIFS period without incurring a deferral penalty. More details on the fragmentation procedure are described below.

MPDUs carry a MAC header that contains a single-bit field called 'More Fragments'. A More Fragments field set to 0 indicates to a receiving station that no other MPDUs are to follow and that it can begin to reconstruct the corresponding MSDU. A More Fragments field set to 1 indicates to the receiving station that another MPDU is forthcoming.

The transmission procedure for fragmented packet may be as follows. First, the sending station performs the normal DCF medium access procedures to acquire the medium, at which point it transmits the first MPDU fragment. When the transmitting station receives the positive acknowledgement (ACK) from the receiving station it waits until the expiration of a SIFS period and transmits the following MPDU. This MPDU—ACK—SIFS—MPDU procedure is repeated until all MPDUs associated with a single MSDU have been sent and successfully acknowledged. This procedure may be interrupted if the entire MSDU is not delivered within a standards-defined time limit called the MSDUMaxTransmitLifetime value. A timer is started at the first MPDU transmission, if this timer value reaches the MSDUMaxTransmitLifetime value before the entire MSDU is transmitted, the transmitting station will cease transmission. At this point, the transmitting station will indicate to the LLC layer that the MSDU transmission failed. Similarly, a receiving station will wait for MPDUs associated with an MSDU for a specified period of time, called the MSDUMaxReceiveLifetime. If a receiving station does not collect all MPDUs associated with an MSDU before this timer expires, it will discard all received MPDUs.

Signal Flow in 802.11

The following section describes the signal flow of MSDUs in the IEEE 802.11 standard from a transmitting station to a receiving station. In particular, the inter-layer communication to pass an MSDU from one transmitting station LLC to another receiving station LLC is described. Also, the specific MPDU generation and fragmentation process is described below. The process executed on the AP is reviewed. The following description relies on terminology found in Appendix C of the 802.11 standard, which describes the 802.11 procedures programmatically using the SDL language.

LLC to MAC

When a transmitting station wishes to send higher-layer data to a receiving station, its LLC layer 102 will issue a MAUnitData.request(sa,da,rt,LLCdata,cf,srv) message to its MAC layer 103. This message contains 6 parameters associated with the MSDU: the source addresses (sa), the destination address (da), the routing type (rt), the octet stream representing the higher-layer data (LLCdata), the desired contention behavior (cf) and the service type (srv). The routing type is set to 0 in the standard. The cf parameter indicates whether the DCF or the PCF mode of operation is desired. Since only DCF operation is considered here, all packets of interest will have this value set to 'contention'. The service type indicates whether the packets require Strictly Ordered service or can tolerate Reordable Service. Most packets can tolerate Reordable service. It is noted nonetheless, that aspects of the invention may also apply to packet requiring ordered service as well and have similar fields.

MSDU Generation

The MAC layer process called MSDU_from_LLC receives this MAUnitData.request message and validates the parameters of the message. Once the parameters are validated, the MSDU_from_LLC process invokes the Make_MSDU sub-thread. This sub-thread composes the information into a valid MSDU. This is done by invoking the mkFrame operation, which composes a valid 802.11 frame including header fields. The Make_MSDU sub-thread creates an MSDU with the following MAC header fields: frame type set to 'data', destination address, sending address, and the addr3 parameter (which is derived from the AP's own MAC address). The other header fields are set to 0. The MSDU contains a frame body that is exactly the LLCdata vector passed in the MAUnitData.request message. This MSDU is then sent via an MsduRequest message to the DSM_Interface process of the Distribution Service block.

The DSM_Interface process checks to see if the destination address belongs to a station that is currently associated with the AP, i.e., a part of the wireless network served by the AP. If it is, the MSDU is changed so that its MAC header field 'FromDS' equals 1 and is sent via a new MsduRequest message to the Prepare_MPDU process with the MPDU_Generation_AP block.

Fragmentation Process

The Prepare_MPDU process imports the appropriate security settings and invokes a sub-thread called "Fragment." The Fragment sub-thread determines if the MSDU needs to be fragmented into multiple MPDUs. Fragment creates a new kind of SDU called a Fragment SDU, or FSDU, to be associated with the current MSDU. An FSDU contains parameters specific to the fragmentation process including the following important fields: fTot, fCur, and pdus. The fTot parameter defines the total number of fragments that will be associated with the current MSDU. The fCur parameter identifies the current fragment that is being processed. The pdus parameter is an array of fragment MPDUs. This array contains the individual MPDU descriptions that will constitute the MSDU.

The first thing that "Fragment" procedure may do is initialize the FSDU. Next, "fragment" may determine how many fragments, or MPDUs, will be required to transmit the pending MSDU. This is done by: first importing the 802.11 parameter dot11FragmentationThreshold; second, subtracting from this parameter the number of bytes associated with the MAC headers and FCS checks (24+4=28 bytes) and calling the result pduSize; and finally dividing the length of the LLCdata by the resulting pduSize and taking the ceiling, i.e., rounding any remainder up. This value is recorded as the FSDU parameter fTot—the total number of MPDUs required to deliver the pending MSDU.

Once fTot is determined, the process then invokes a second sub-thread called Make_Pdus. This second sub-thread is shown with your spec to FIG. 5. This sub-thread packages the received MSDU into the fTot MPDUs, assigning the appropriate MAC headers to each MPDU. The first thing that Make_Pdus does is initialize the first entry in the FSDU pdus array though an fsdu!pdus(0)=Null assignment in steps 501-502. Next, Make_Pdus will separate the bytes of the MSDU into a header portion and a data portion in steps 503-504. Stripping the first 24 bytes from the MSDU derives the header portion, while the next pduSize bytes may be the data portion for the current MPDU. Make_Pdus may then determine whether or not to set the 'More Fragments' field in the header of the current MPDU in step 505. If the current MPDU is not the fTot-th, or last, MPDU, the 'More Fragments' bit is set to 1 in step 506, otherwise it is set to 0. The last step in preparing an individual MPDU is to send it to the encryption process. The remaining steps of determining whether WEP is used (step 507), encrypting in step 508 and checking the data structure in step 509 are not described in detail.

This process repeats until all fTot MPDUs are stored in the FSDU pdu array in steps 511 and 512. Each of the MPDUs contains a header portion that is derived from the first 24 bytes of the MSDU, therefore all MPDUs have the same header information. The data portions of the MPDUs are derived from subsequent pduSize-sized chunks from MSDU.

When this is completed, the Fragment sub-thread sends the whole FSDU, including the FSDU pdu array constituting all the MPDUs associated with the pending MSDU, in a FragRequest(fsdu) message to the PM_Filter process in step 513.

In summary, at this point there may be a single FSDU that contains an array where each MPDU associated with the MSDU resides.

MPDU Transmission

The PM_filter process first determines the current power saving mode in operation on the transmitting station. For illustrative purposes, APs that do not enter power saving a mode are considered. Next, PM_filter places the entire FSDU into the transmission queue. Finally, if there is no pending transmission the PM_filter process will issue a PduRequest message containing the FSDU to the TX_Coordination_AP process within the Protocol_Control_AP block.

The TX_Coordination_AP process will take the passed FSDU and construct individual transmission PDUs out of the MPDUs stored in the FSDU pdu array. The process may also update some MAC header fields for each of the MPDUs before they are delivered to the PHY layer. For instance, it may set the Duration/ID field and the tx_rate field. The process will lastly determine if the MPDU is still below the fragmentation threshold. If it is, the TX_Coordination_AP process sends it to a sub-thread called Send_MPDU. This sub-thread invokes all the PHY layer specific procedures necessary to transmit the MPDU to the receiving stations PHY layer. Send_MPDU will essentially transmit the MPDU and await an acknowledgement frame from the receiving station. Upon receipt of the acknowledgement, the Send_MPDU sub-thread will handoff to the Confirm_PDU sub-thread. This sub-thread will determine if all the elements in the FSDU pdu array have been transmitted, or if the MaxMPDUTransmitLifetime has been exceeded. If neither of these two conditions exist, then Confirm_MPDU hands control over to the Send_Frag process, which begins the Send_MPDU sub-thread before the particular MAC header fields are inserted, as discussed above. This flow of control continues until the FSDU pdu array has been exhausted or the MaxMPDUTransmitLifetime value has been exceeded.

Once the entire MSDU has been transmitted successfully, a series of messages is passed through the various processes back to the LLC layer. These messages allow the LLC layer to learn of the fate of each MSDU it sends to the MAC layer. The fragmented MPDUs do not generate these status messages; they are only generated when a full MSDU has been transmitted. Therefore the operation at the LLC layer deals only with MSDUs—the creation and transmission of fragmented MPDUs is purely a MAC process and is transparent to the LLC Layer.

Processes for Aggregation and Fragmentation.

Current WLAN systems may not be well-suited to support isochronous services such as voice that have strict requirements on delay and jitter. This is because the DCF MAC protocol implements the backoff procedure that is random, offers no guarantee of access, and can cause unbounded delays. AP environments, where a collection of mobile stations communicates via an AP, are the most prevalent deployment configuration of WLANs. The AP contends for the medium on behalf of multiple data sessions and, consequently, carries a greater load than individual stations. The 802.11 MAC protocol, however, affords no special privileges to the AP and it achieves the same degree of medium access as individual stations despite the increased load. In aspects described herein, the invention describes a method to increase the downlink efficiency of IEEE 802.11 APs by enabling them to consecutively transmit multiple packets, to a variety of receiving stations, with the minimum inter-transmission time of a SIFS period. In at least one aspect, this permits APs to send consecutive data packets without interruption, clear buffer space before packets are dropped and improve performance.

Aspects of the invention describe one or more ways that an AP can use the above-defined fragmentation process of the 802.11 standard to multiplex downlink packet transmission to multiple receiving stations.

Aspects of the present invention address functionality located in two of the above layers, namely the LLC layer and the MAC layer. One or more of the aspects of the invention generally includes two parts—an aggregating process that occurs at the LLC layer, and a fragmenting process that occurs at the MAC layer.

In the conventional approach, the MAC header information is constructed by parceling out the first 24 bytes of the MSDU octet stream. The fixed-length MAC header makes this process possible and efficient. Additionally, MAC header information for all MPDUs is determined by the first 24 bytes of the MSDU octet stream. This means that all MPDUs share the same destination address, which means that all fragmented MPDUs must be destined for the same receiving station. On the other hand, at least one aspect of the present invention may enable fragment MPDUs to be delivered to different receiving stations and this allows downlink packet multiplexing and improves system performance. Other aspects permit the fragment MPDUs to be delivered to the same receiving stations.

In the conventional approach, the entire FSDU pdu array constituting all MPDUs associated with a single MSDU is sent as a single unit to the transmission process. This means that transmission of a fragmented MSDU is treated as an atomic process, e.g., the MAC layer will not interrupt it until the process has been completed. The LLC layer only hears about the success or failure of an MSDU, not the individual MPDUs. One or more aspects of the present invention propagate MPDU status information back to the LLC layer, thereby addressing one or more of the above concerns.

Packets may be aggregated together then fragmented in accordance with aspects of the present invention. Voice packets are used for illustrative purposes. Other packets may be used. Any packet type conforming to certain size restrictions may be aggregated.

MPDUs may be referred to as having "identical" header information. This is used to indicate that identical parameters are passed to the mkFrame process. The mkFrame process will insert time-sensitive information into MPDU MAC headers, such as timestamps. These values depend upon the time at which the mkFrame process is called. Therefore, even though the process is operating with exactly the same information, it will produce MPDUs with different MAC headers. The MAC headers of any two packets are necessarily different because the mkFrame process that creates the headers will be called at different times. However, "identical" is used to mean that the identical parameters are passed to the mkFrame process.

The term PduSize may to refer to the number of bytes that may be carried as user information in each aggregated and fragmented packet.

Aspects of the invention include two procedures: (1) an Aggregation procedure performed at the LLC layer and (2) a Fragmentation procedure performed at the MAC layer.

Figure 2:
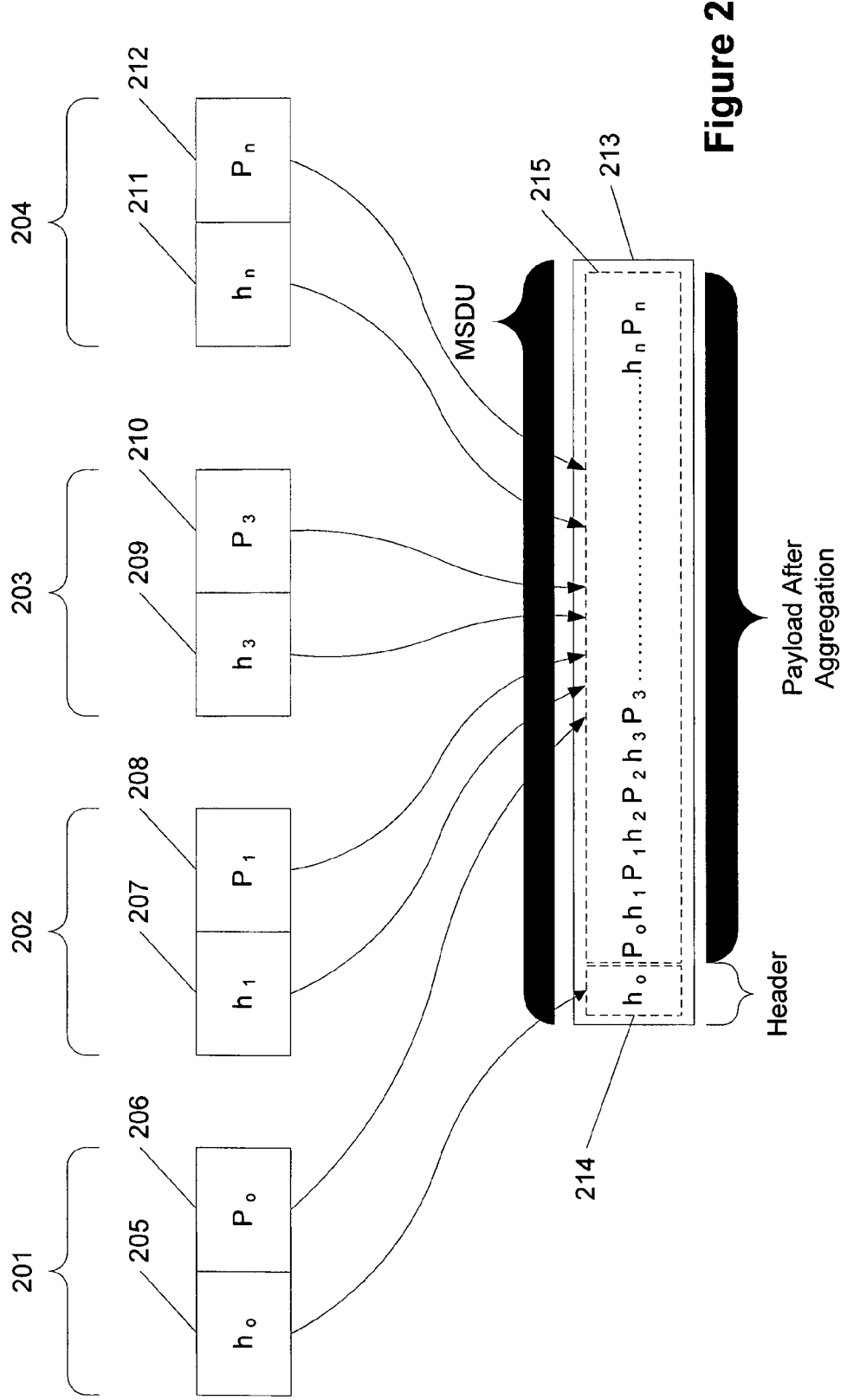
FIG. 2 shows an aggregation process in accordance with aspects of the present invention.
Figure 3:
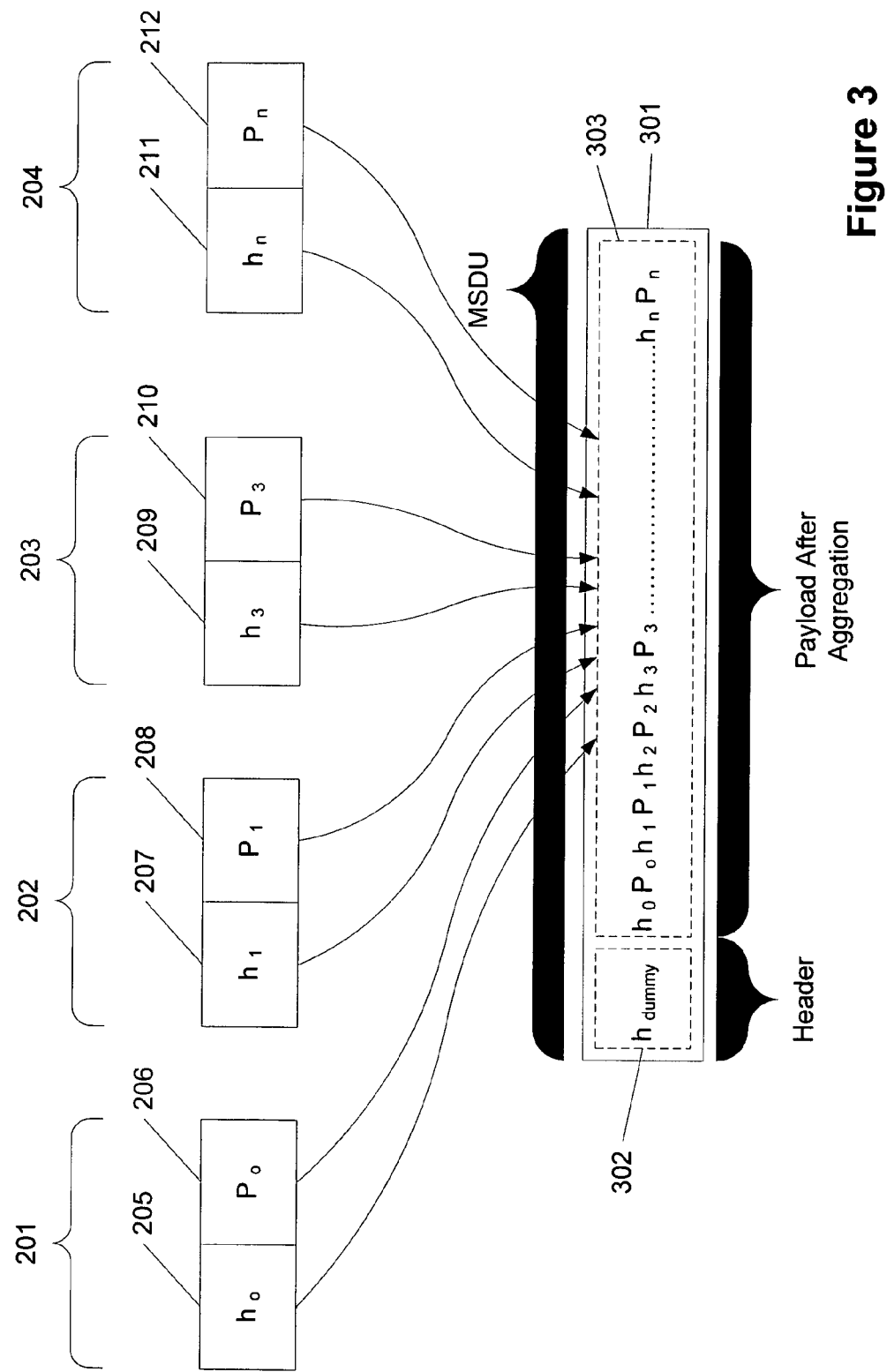
FIG. 3 shows an alternative aggregation process in accordance with aspects of the present invention.

With respect to the aggregation procedure, FIGS. 2 and 3 show how packets may be combined. In FIG. 2, data packets 201-204 are received into LLC layer 102. Each of packets 201-204 includes a header and a payload. The headers ($h_0$-$h_n$) 205, 207, 209, 211 are associated with payloads ($P_0$-$P_n$) 206, 208, 210, 212. LLC layer 102 then aggregates the data packets 201-204 into MSDU 213 that includes a header 214 and a payload 215. Here, header $h_0$ 205 is used as header 214. Payload $P_0$ 206 is combined with the remaining packets 202-204 into payload 215. This aggregated MSDU 213 is then forwarded to MAC layer 103.

FIG. 3 shows an alternative approach to aggregating packets. Here, packets 201-204 are combined into MSDU 301. Similar to the aggregation of FIG. 2, the aggregated MSDU 301 includes header 302 and payload 303. Header 302 is not header $h_0$ 205, but rather a dummy header $h_{dummy}$. Payload 303 includes the payload 206 and other data packets 202-204 as well as header $h_0$ 205 from packet 201.

Figure 4:
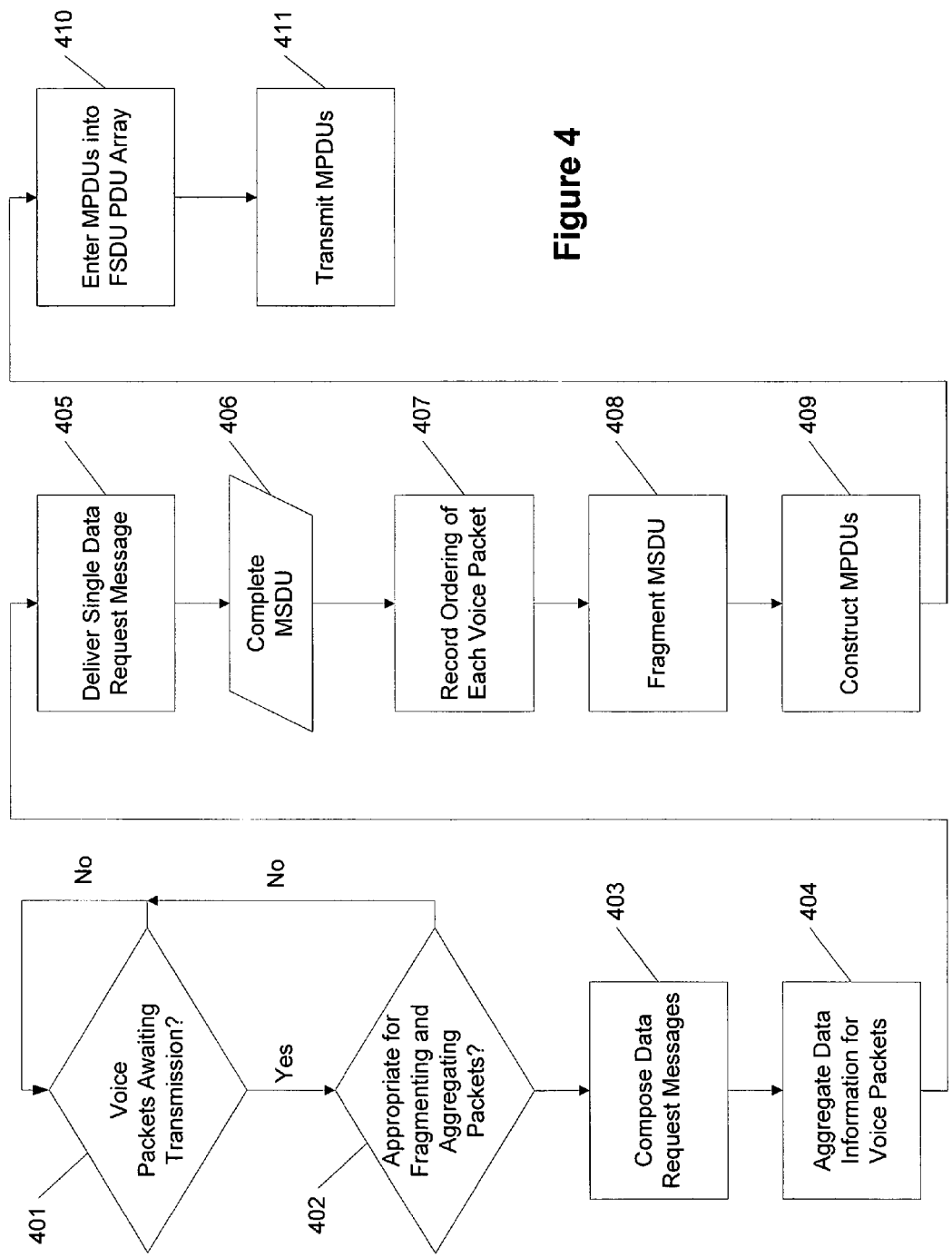
FIG. 4 shows a process for handling voice packets in accordance with aspects of the present invention.

The following describes various procedures in accordance with aspects of the invention. FIG. 4 shows various processes for aggregating and fragmenting packets in accordance with aspects of the invention. In step 401, the AP determines if forced packets are awaiting transmission. When the AP determines that there are two or more packets in its buffer waiting transmission, the AP then decides in step 402 to initiate the aggregation and fragmentation process. The test for whether the aggregation and fragmentation process should begin may include an evaluation of the number of voice packets, the size of the voice packets, the rate at which the voice packets are being received, or any combination or some combination thereof. Other tests may be included or replace those described above.

In step 403, the LLC layer composing, but not delivering, N MAUnitData.request messages—one for each of the voice packets N (where the number of voice packets is greater than 1). The message associated with the i-th voice packet carries the following parameters:
  1. Source address=SAi
  2. Destination address=DAi
  3. Routing type=RTi
  4. Higher layer data=LLCDatai
  5. Contention status=CFi
  6. Service type=SRVi As described above, all N packets may or may not have identical routing types, contention status, and service types. The N voice packets may be distinguished on a variety of criteria that may include their source and destination addresses and their LLCData vectors, for instance. In one implementation, the source and destination addresses may be a fixed length. For instance, the source and destination addresses may be six bytes long. Of course, the designation of the number of bytes pertains to the underlying structure of the protocol. The number of bytes associated with the source and destination addressees may be modified to comport with the protocol used.

Next in step 404, the LLC layer 102 at the AP aggregates the LLCData information and the source and destination addresses (SA and DA) for each of the N voice packets single LLCAggData vector. The source and destination addresses associated with the first voice packet may be handled separately (namely, as shown in FIG. 2, the source and destination addresses may be set as the header 214).
  a. The SA and DA associated with the first packet are not included in LLCAggData 215.
  b. The aggregated LLCAggData may be expressed as LLCAggData=LLCData1:(SA2,DA2):LLCData2: . . . : (SAn,DAn):LLCDatan
  c. In an alternative approach, rather than using the first header as a header for the LLCAggData, a dummy header can be used (as shown in FIG. 3).
  1. In this scenario the SA and DA associated with the first packet (as well as those of the other packets from the first scenario) are included in LLCAggData.
  2. The aggregated LLCAggData 303 may be expressed as LLCAggData=LLCData1:(SA1,DA2): LLCData2: . . . :(SAn,DAn):LLC Datan.

In step 405, the LLC 102 delivers a single MAUnitData.request message to the MAC layer 103 using the aggregated LLCAggData vector and the header information associated with the first voice packet.
  a. This may be expressed as MAUnitData.request(SA1, DA1,RT1,LLCAggData,CF1,SRV1).

In an 802.11 implementation, the LLC 102 may alter the value of two 802.11 parameters:
  a. The LLC may change the value of the 802.11 parameter sMSDUMaxLng to be at least as large as the size of the LLCAggData vector.
  b. The LLC may change the value of the dot11FragmentationThreshold to equal the length in bytes of the original LLCData vector of the voice packets.

Aspects of the invention also can be used with voice packets of varying length by updating the algorithm that populates the data portion of the MPDUs. For illustrative purposes, all N packets have the same LLCData vector size. However it is noted that and packets may have different vector sizes.

Some illustrative ways of using the same methods even when the length is greater than the set threshold value are to:
  1. Set flags to indicate the same address information should be used for excess data as the previous packet (this approach may tax resources).
  2. Group similar sized payloads (this approach requires reordering but is robust).
  3. Scan for common headers ((n−1) headers) (this approach may lead to additional delays).

The LLC may also change a new 802.11 parameter, mAggNum, to the value N.

As shown at 406, the MAC layer 103 has a complete and valid MSDU to process. Here, the MAC layer 103 may determine whether or not the MSDU is to be processed (this may include consulting the mAggNum parameter: if zero—proceed according to the standard DCF rules; if non-zero—proceed according to the aggregating and fragmenting procedures herein). If aggregating and fragmenting is required, the MAC 103 knows how many fragment packets to construct based on a predefined acceptable file size or range of sizes for each fragment.

In step 407, the LLC 102 may record the ordering of each of the voice packets (1 through N) so that it can properly correlate confirmation messages received from the MAC layer to the appropriate voice packet. Steps 405-407 may vary in the order in which they are executed.

In step 408, the MAC layer 103 then fragments the special MSDU into special MPDUs for transmission.

In step 409, the MAC layer 103 next constructs N MPDUs. The construction of N MPDUs may occur in accordance with a variety of procedures, of which one may include the following (it is noted that the specific byte values shown below are for illustrative purposes only and may be varied based on the use of different protocols):
  a. The first MPDU may be constructed of the header information delivered in the MAUnitData.request message and the data information contained in the first PduSize bytes of the LLCAggData vector.
  b. Each subsequent MPDU may have identical header information to the immediately preceding MPDU with the following exception:

1. The source address may be constructed from the next 6 bytes of the LLCAggData vector;
2. The destination address will be constructed from the next 6 bytes of the LLCAggData vector after the source address c. Each subsequent MPDU may construct its data information from the next PduSize bytes, after the 12 bytes used to construct its source and destination addresses, of the LLCAggData vector.

d. All MPDUs may have the 'More Fragments' bit set to 0.

It is noted that in the above step, the MAC layer 103 may construct the fragments in a slightly different manner if a dummy header is used rather than the source and destination for the first packet. The process will be generally the same with the following points:

1. The dummy header may be skipped or discarded.
2. The source address may be constructed from the first 6 bytes of the LLCAggData vector before continuing with step b (2) above.

Next, in step 410, once all MPDUs have been created and entered in the FSDU pdu array, the MAC layer 103 sends the FSDU to the PHY layer 104 for transmission.

In step 411, the PHY layer 104 transmits each of the MPDUs according to the normal 802.11 fragmentation procedures with the following exception:

a. Upon receipt of an ACK packet, the MAC layer 103 issues a message to the LLC confirming the successful transmission of the voice packet.

Figure 5:
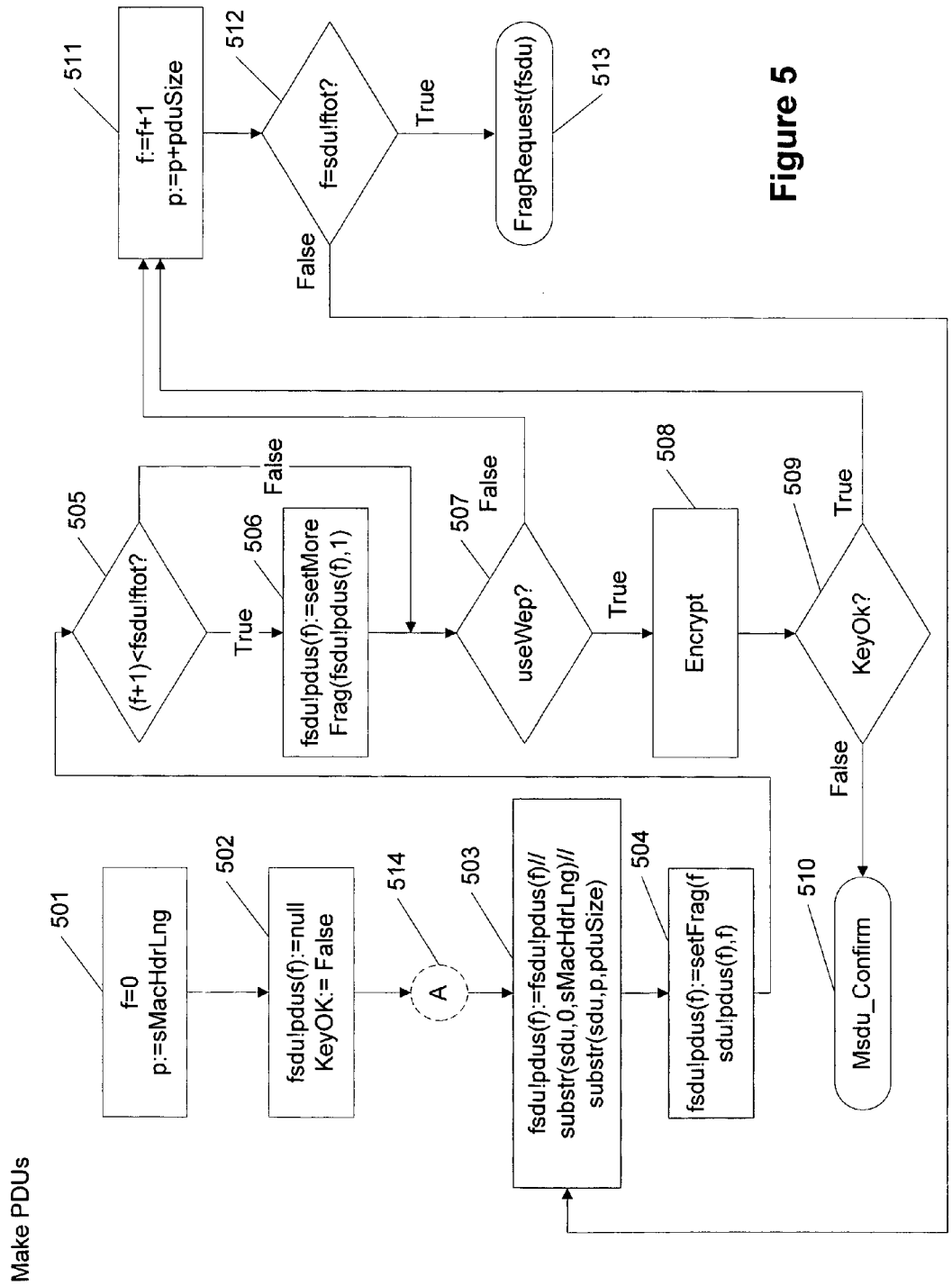
FIGS. 5 and 6 show fragmenting processes in accordance with aspects of the present invention.
Figure 6:
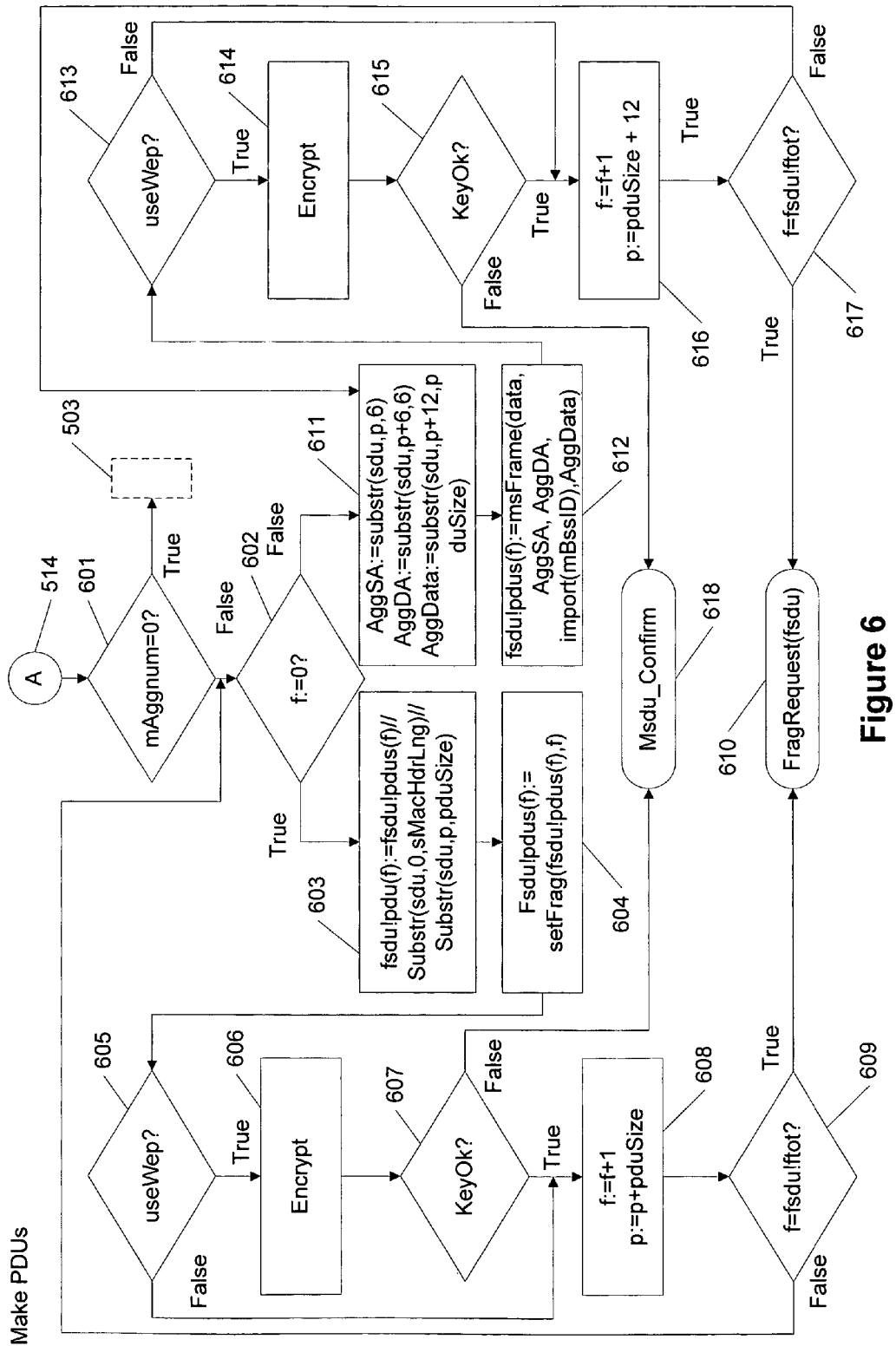
Figure 7:
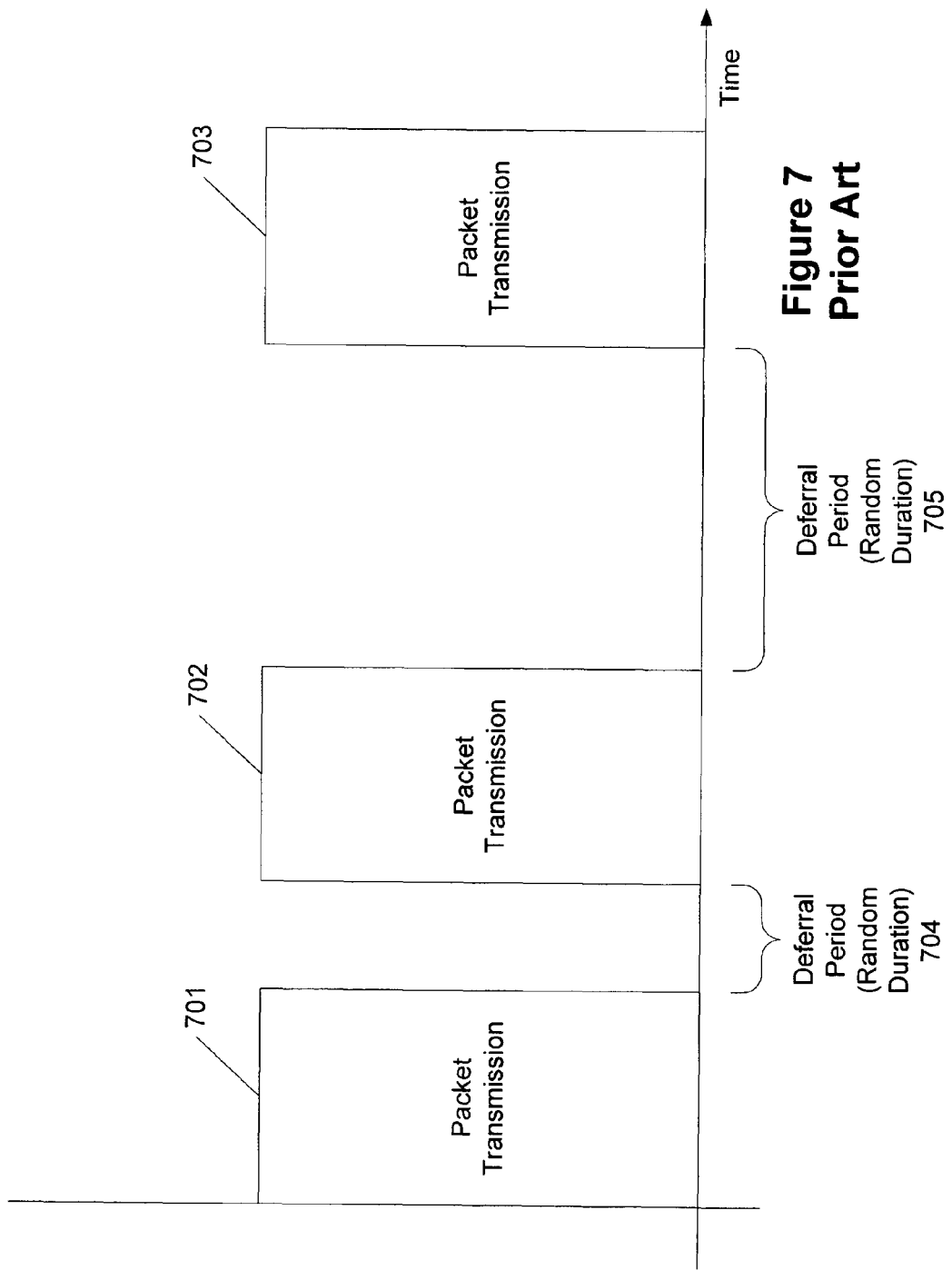
FIG. 7 shows conventional packet transmissions.

FIG. 5 shows the Make PDUs thread of 802.11. the additional fragmentation procedure as described herein is shown in FIG. 6, which departs from FIG. 5 at point A 514. FIG. 5 is readily available in the 802.11 specification. In steps 501-502, the values are initialized. In step 503, the process fills the header and payload for the fragments. In step 504, the process sets a fragment bit. In step 505, the process determines whether more fragments need to be created. If yes, then more fragments are created in step 506. If no and after step 506, the process determines if WEP is being used. If yes, then the fragments are encrypted in step 508, checked in step 509, and if not ok, then sent to MSDU_Confirm 510 to alleviate any issues. If false from step 507 or true from step 509, the process continues with step 511. In step 511, a counter is incremented to move to the next fragment. If, in step 512, all fragments have been completed, then the fragments are sent in step 513. If not, then the next fragment is created in step 503.

FIG. 6 shows the modification to the standard 802.11 procedure. As shown in FIG. 6, the particular sub-thread takes the passed LLCAggData vector and creates multiple MPDUs, each with their own header information. These MPDUs are stored in the FSDU structure and passed to the PHY Layer in the FragRequest(fsdu) message.

As shown in FIG. 6, the fragmentation process described herein begins at point A 514. In step 601, the system determines if the number of packets needs to be aggregated is zero. If yes, the system returns to step 503 and proceeds as shown in FIG. 5. If no, the system then determines in step 602 which fragment is to be handled. If the first fragment, then the process processes the first fragment as shown in steps 503 and 504. If not the first fragment, then the process handles the fragments as putting the first bits (here, for instance, 6) in the aggregated source address (AggSA), the next set of bits (here, 6) in the aggregated destination address (AggDA), and the remaining bits (to the end of the pduSize) in the aggregated data (AggData) as shown in step 611. Next, in step 612, the system sets the fragmentation bit.

Next, steps 605 and 613 (using WEP?), steps 606 and 614 (encrypt), steps 607 and 615 (KeyOk?) mirror the functionality described in steps 507-509 above. Step 618 is similar to that of step 510 above. Step 608 is similar to step 511 where the counter is incremented. In step 609 the process determines if there are more fragments to process. If yes, then the process repeats at step 602. If no, then the fragments are sent in step 610.

Step 616 is similar to that of step 511 where the counter is incremented and the payload added. If there are more fragments to process in step 617, the process repeats at step 602. If no, then the fragments are sent in step 610.

Another aspect of the invention allows the aggregation and fragmentation of packets that are not equal in size. This involves the use of an array of pduSize values—each entry in the array corresponding to the data portion length of the corresponding MPDU. In this case, each MPDU may be created by taking the appropriate number of bytes from the passed SDU value and noting that this passed SDU is an octet stream comprising a header portion associated with the first aggregated and fragmented packet and a data portion associated with the LLCAggData vector.

Aspects of the invention may be used to increase voice capacity in 802.11 networks without requiring client-side modifications. APs, overburdened with downlink data traffic, may aggregate multiple voice packets into a single aggregated and fragmented packet, which may be delivered by the medium using the smallest possible inter-packet times. By eliminating the standard post-transmission backoff, packet delays may be reduced and voice quality improved. Additionally, this technique may reduce overhead by collapsing N media access attempts into 1, further improving performance and increasing capacity.

Aspects of the invention may be used to perform once-in-a-while relief to over burdened APs. The AP may decide that it is experiencing excessive queue buildup and decide to aggregate and fragment multiple voice packets to help remove packets from its queue before subsequent packets are dropped and voice performance deteriorates.

A variation of this utility may be thought of in the military context. For instance, a set of important, time-relevant commands such as firing instructions, target coordinates, etc., may be needed to be sent in a specified period of time. Aspects of the invention allow the AP to combine the individual packet elements of this command, and deliver them over the medium within the minimal allowable time. Thus a long set of commands—containing multiple packet elements, requiring multiple post-transmission backoffs—can be delivered by incurring only one initial backoff delay. The delay in getting the multiple message across may be equal to the delay in initially accessing the medium, as opposed to the many such delays that may have been encountered had the individual packets stream been transmitted in the standard fashion.

Aspects of the invention also have applicability in the sensor networking and data fusion spaces. Typically sensor networks generate many different types of information collected from multiple independent sensors. Data fusion is the process by which the data of these multiple streams are combined into a more efficient delivery mechanism. Consider a sensor network composed of thousands of sensors collecting and reporting data to a central data aggregator. Each of these sensors generates small packets of information that are desired to be fused and delivered to a processing center, or gateway, that interfaces with external networks. An AP equipped with the aggregating and fragmenting approaches described herein may serve as a wireless gateway device for such sensor networks. This AP may collect the thousands of individual packets from the sensors and aggregate and fragment the individual packets to a remote command and processing center. This process is more efficient and timely than a standard 802.11 approach.

Aspects of the invention may be applied to at least to any medium access protocol that imposes a random access time between consecutive transmissions. The specifics of the aggregation and fragmentation procedures would need to be adapted to the protocol.

A number of other applications of the aspects of the invention are possible and the above examples are by no means exhaustive. The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method for handling communications in an access point comprising the steps of:
receiving original data packets at said access point, the original data packets including a first data packet having a first header and a first payload and a second data packet having a second header and a second payload;
aggregating in said access point said original data packets into an aggregated data packet, said aggregated data packet including an aggregated data packet header and an aggregated data packet payload where the aggregated data packet payload includes at least said first payload and said second header and said second payload;
fragmenting in said access point said aggregated data packet into fragmented data packets; and
outputting said fragmented data packets via a transceiver of said access point.

2. The method according to claim 1, wherein said original data packets include voice information.

3. The method according to claim 1, wherein said original data packets include time-sensitive data.

4. The method according to claim 1, wherein said aggregating step is performed in an LLC layer of said access point.

5. The method according to claim 1, wherein said fragmenting step occurs in a MAC layer of said access point.

6. The method according to claim 1, wherein said fragmented data packets are capable of being received by a system that recombines said fragmented data packets and extracts said original data packets.

7. The method of claim 1, wherein the step of receiving original data packets includes receiving at least one original data packet from each of a first source address and a second source address, and wherein the step of outputting said fragmented data packets includes transmitting at least one fragmented data packet to each of a first destination address and a second destination address.

8. The method of claim 1, wherein said aggregated data packet header includes said first header.

9. The method of claim 1, wherein said aggregated data packet header is a dummy header and said aggregated data packet payload includes said first header.

10. A non-transitory computer-readable medium having a program stored thereon, said program for handling communications in an access point upon execution in said access point, said program comprising the steps of:
receiving original data packets at said access point, the original data packets including a first data packet having a first header and a first payload and a second data packet having a second header and a second payload;
aggregating in said access point said original data packets into an aggregated data packet, said aggregated data packet including an aggregated data packet header and an aggregated data packet payload where the aggregated data packet payload includes at least said first payload and said second header and said second payload;
fragmenting in said access point said aggregated data packet into fragmented data packets; and
outputting said fragmented data packets via a transceiver of said access point.

11. The non-transitory computer-readable medium according to claim 10, wherein said original data packets include voice information.

12. The non-transitory computer-readable medium according to claim 10, wherein said original data packets include time-sensitive data.

13. The non-transitory computer-readable medium according to claim 10, wherein said aggregating step is performed in an LLC layer in said access point.

14. The non-transitory computer-readable medium according to claim 10, wherein said fragmenting step occurs in a MAC layer in said access point.

15. The non-transitory computer-readable medium according to claim 10, wherein said fragmented data packets are capable of being received by a system that recombines said fragmented data packets and extracts said original data packets.

16. The non-transitory computer-readable medium according to claim 10, wherein said aggregated data packet header includes said first header.

17. The non-transitory computer-readable medium according to claim 10, wherein said aggregated data packet header is a dummy header and said aggregated data packet payload includes said first header.

18. A system for handling communications comprising:
an access point with a processor and a transceiver, the processor executing three communication processing layers, the access point being configured to receive original data packets, the original data packets including a first data packet having a first header and a first payload and a second data packet having a second header and a second payload said processor executing the three communication processing layers as:
a first layer that aggregates said original packets into an aggregated data packet, said aggregated data packet including an aggregated data packet header and an aggregated data packet payload where the aggregated data packet payload includes at least said first payload and said second header and said second payload;
a second layer that fragments said aggregated data packet into fragmented data packets; and
a third layer that outputs said fragmented data packets to said transceiver.

19. The system for handling communications according to claim 18, wherein said first layer is a LLC layer.

20. The system for handling communications according to claim 18, wherein said second layer is a MAC layer.

21. The system for handling communications according to claim 18, wherein said third layer is a physical layer.

22. The system according to claim 18, wherein said aggregated data packet header includes said first header.

23. The system according to claim 18, wherein said aggregated data packet header is a dummy header and said aggregated data packet payload includes said first header.

* * * * *

UNITED STATES PATENT AND TRADEMARK OFFICE
CERTIFICATE OF CORRECTION

| | | |
|---|---|---|
| PATENT NO. | : 8,718,089 B2 | |
| APPLICATION NO. | : 10/932322 | |
| DATED | : May 6, 2014 | |
| INVENTOR(S) | : Famolari | |

It is certified that error appears in the above-identified patent and that said Letters Patent is hereby corrected as shown below:

In the Specification

Column 5, Line 50, delete "Reordable" and insert -- Reoderable --, therefor.

Column 5, Line 51, delete "Reordable" and insert -- Reoderable --, therefor.

Signed and Sealed this
Fourth Day of November, 2014

Michelle K. Lee
*Deputy Director of the United States Patent and Trademark Office*